United States Patent Office 2,803,912
Patented Aug. 27, 1957

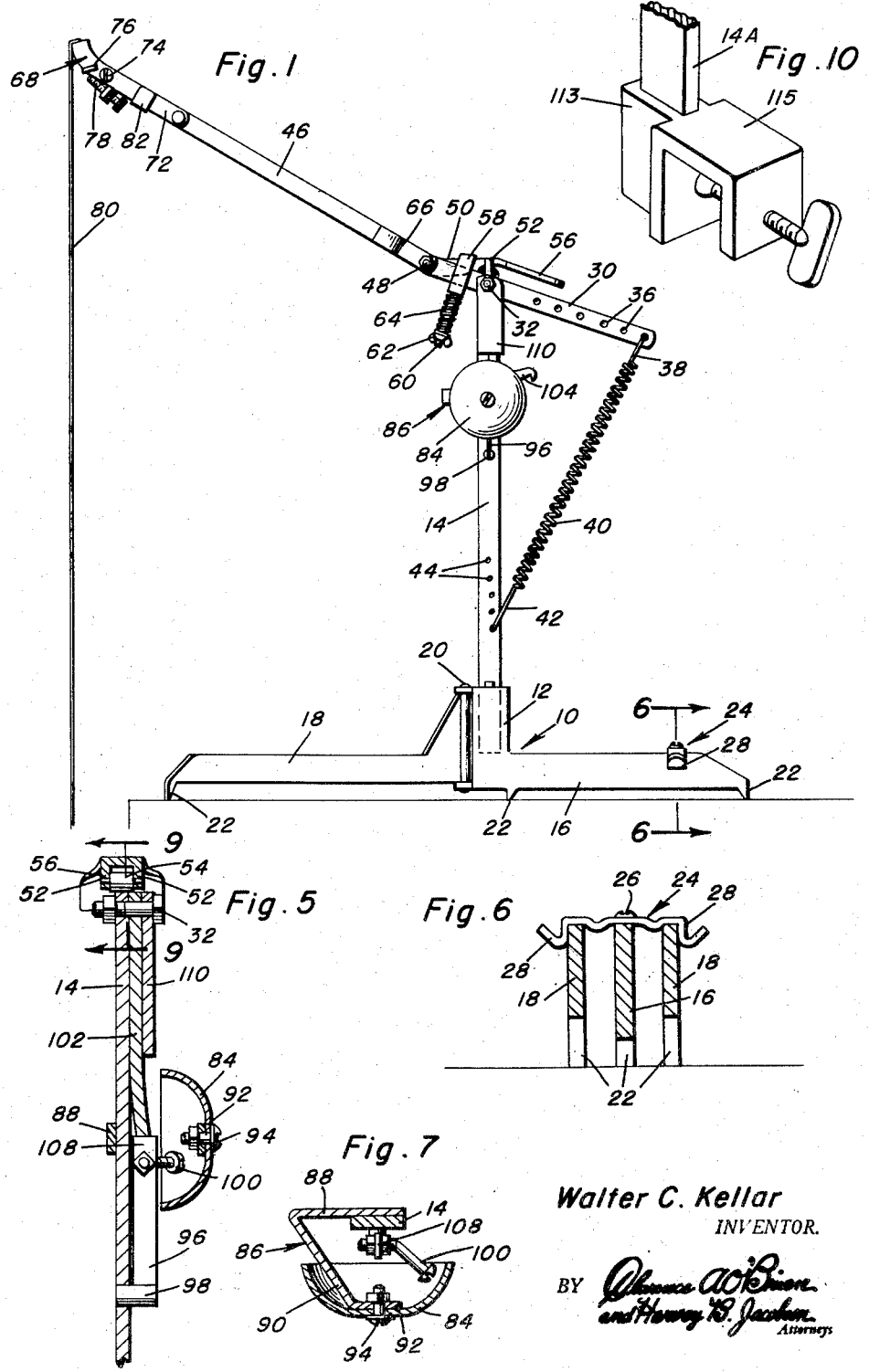

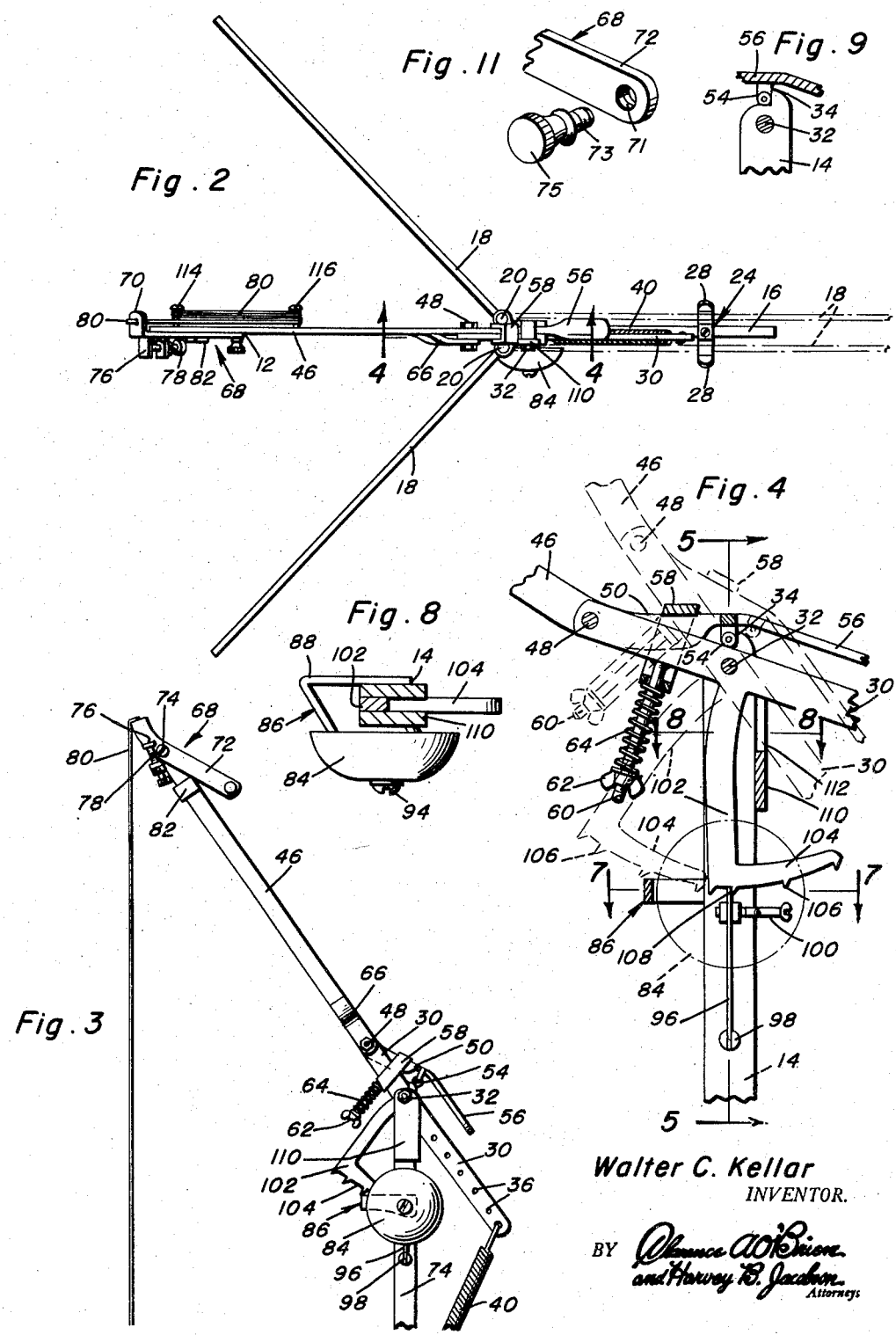

2,803,912

FISHING TIP-UP

Walter C. Kellar, Crookston, Nebr.

Application July 18, 1956, Serial No. 598,690

7 Claims. (Cl. 43—16)

This invention relates to a novel and improved tip-up which is especially, but not necessarily, constructed for ice fishing.

Briefly, the invention pertains to a wholly mechanical contrivance for unattended fishing which is characterized by a stand having a suitable base and a perpendicular standard attached to and rising from said base. Spring biased latch-equipped arm means is hingedly mounted for operation atop the standard and the baited fishing line is attached to the outer or forward end portion of the arm means so that when a fish takes the bait the pull exerted on the line trips said arm means, whereupon the then tensioned biasing spring comes into play and the arm means functions to forcibly jerk the fishing line upwardly and automatically sets the hook in the mouth of the fish, in a generally well known manner.

In carrying out a preferred embodiment of the invention I utilize arm means which comprises a primary or first rigid arm and this is pivotally connected intermediate its ends atop said standard, a coil spring situated rearwardly of said standard and attached at its upper end to the rearward end of said arm and at its lower end to an intermediate portion of said standard, said first arm being vertically swingable in an arcuate path relative to said standard when said spring is cocked and is normally under tension and comes into play, a second rigid arm in general alignment with said first arm and having its rearward end portion pivoted to the forward end of said first arm, the upper end of said standard having a keeper notch therein, the rearward end portion of said second arm being contiguous to and having keeper means seated removably in said keeper notch, spring means cooperable with both of said arms and serving to bias and yieldingly but releasably seat said keeper in said keeper notch, and means on the forward end of said second arm for the attachment of a baited fishing line to said forward end.

Another object of the invention is to provide an audible signal to inform the fisherman that a catch has been made and this involves the use of a simple bell bracketed on said standard and spaced in parallelism from the standard, a spring finger having its lower end also fixed on said standard and its upper end freely actuatable in the space between the standard and open concave side of the bell and provided with a striker normally out of contact with the bell rim but capable of being struck against said bell to provide an audible signal, and actuating means for the finger and striker fixed on and depending from said first arm and operatively engageable with the extreme upper end of said finger.

A further object of the invention has to do with a pull actuated visual signal member. This is pivotally mounted on the free outer or forward end of said second arm and, as the trapped fish swims about in the water, said signal member pivots and swings up and down and lets the fisherman know that the fish is still on the line.

An additional object of the invention is to provide a stand having a tripodal-type base which lends itself to satisfactory use when ice fishing and which is characterized by a single stationary leg and a pair of companion pivotally mounted folding legs permitting the base to be opened or spread for use; or, if desired practically folded for handling and storage when not in use.

Other objects, features and advantages will become more readily apparent from the following description and the accompanying drawings.

In the drawings:

Fig. 1 is a side elevation of the improved unattended tip-up showing the relationship and position of the parts when the tip-up is set and cocked for use;

Fig. 2 is a top plan view of the same;

Fig. 3 is a similar view, with portions of the stand omitted, showing the position and relationship of the parts when the latch or catch has been released and the catch has been made;

Fig. 4 is a view fragmentarily shown and in section and elevation taken approximately on the plane of the line 4—4 of Fig. 2 and showing in full and dotted lines the set and released position and action of the parts;

Fig. 5 is a fragmentary view taken on the vertical line 5—5 of Fig. 4 with parts in elevation;

Fig. 6 is an enlarged section on the line 6—6 of Fig. 1;

Fig. 7 is a section on the line 7—7 of Fig. 4 with the bracketed bell appearing in full lines;

Fig. 8 is a section on the line 8—8 of Fig. 4;

Fig. 9 is a section on the line 9—9 of Fig. 5;

Fig. 10 is a fragmentary perspective view of a modified base for the stand; and

Figure 11 is a perspective view on an enlarged scale of the visual signal means.

Referring now to the drawings the base of the stand is denoted generally by the numeral 10 and comprises a central hub or socket member 12 in which the lower end of the vertical complemental standard 14 is suitably fastened. As before stated, this is a collapsible or folding base and therefore embodies a single rigid leg 16 and a pair of complemental folding legs 18. These are hingedly or pivotally mounted on the socket member in any suitable manner as at 20. Since the form of the stand shown is designed for ice fishing the legs are provided on their bottom sides with tongues or spurs 22 to be embedded in the iced surface (not detailed). A suitable clip 24 is fastened at 26 atop the fixed leg 16 and has spring detents 28 at its ends which function to hold the legs 18 in folded positions alongside the leg 16 as seen in Fig. 6.

Referring now to the aforementioned arm means this comprises a rigid linearly straight bar 30 which constitutes what is hereinafter referred as the first or primary arm. This is pivotally or hingedly mounted intermediate its ends on the upper end portion of the standard as shown at 32 in Fig. 4. That portion of the standard above the pivot is suitably notched to provide a keeper seat 34 functioning as later described. The rearward or right hand end portion of arm 30 is provided with selectively usable holes 36 for the hooked end 38 of a coil spring 40. The hook 42 on the lower end of the spring is selectively engageable in similar anchoring holes 44 provided in the intermediate portion of the standard. This construction allows the tension of the spring to be regulated and maintained as desired. The arm means also comprises a second or companion arm 46 the rearward end portion of which is pivotally mounted at 48 on the forward end of arm 30 in advance or to the left of the standard and pivot 32. The stated arm 46 not only overlaps the cooperating end portion of the arm 30 but has an upwardly offset rear end portion which may be described as an extension 50. The extension normally overlies the notched upper end of the standard and the intermediate portion has suitable depending parallel ears (Figs. 4 and 5) denoted by the numeral 52 and provided with bearings for journals on the ends of a latching or keeper roller 54. This roller is obviously engageable in the keeper notch 34 in the manner shown in full lines in Fig. 4 when the tip-up is latched and set for the fishing expedition. That portion of the extension beyond the roller 54 is fashioned into a suitable finger-piece 56 which assists in setting the tip-up and cocking the spring 40. A loop-like collar or shackle 58 is provided and encircles or embraces the extension 50 and the adjacent portion of the arm 30 and is therefore located between the pivot 32 and the pivot 48. It is fixed at its upper end on the extension. The lower end portion is spaced below the arm 30 and is slidingly mounted on a stud 60, the upper end of which is fixed to the lower edge of arm 30, the lower end of the stud being threaded to accommodate an adjusting nut 62 cooperating with a coil spring 64 surrounding the stud and abutting the nut at one end and the lower portion of the collar at the other end. The numeral 66 denotes a brace fixed to and laterally off-set from the pivoted end of the arm 46 and which is also connected with the pivot 48 to provide a satisfactory pivotal connection between the two arms.

Attention is now directed to a so-called bobber-like visual signal member 68 situated at the forward end of the second arm 46. As seen in plan in Fig. 2 this is L-shaped and the short arm 70 is spaced from the tip of the arm 46 and the long arm 72 is pivotally connected intermediate its ends at 74 alongside the cooperating end portion of the arm 46. This arm 72 is provided with an outstanding fixed abutment 76 engageable with an adjustable stop screw 78 operatively mounted on the arm 46. This limits the upward swing of the arm 72 as shown in Fig. 3. It may be stated at this time that the upper end of the fishing line 80 is suitably attached to the arm 70. It will also be noted in Figs. 1 and 3 in particular that the second arm 46 is provided with a rigid stirrup-like stop 82 which is positioned to check the downward swing of the arm 72 and also to assist in holding it in its initially set position. This signal member 68 will bob up and down after the catch has been made to signal the fisherman that the fish is still on the line. It has also another purpose and that is when the baited hook on the line 80 is taken by the fish, the member 68 swings from the set position of Fig. 1 to the tripped position of Fig. 3 and this movement allows a limited pay-out of the line and assists in making the catch in what is believed to be an obvious manner.

The audible signal comprises the common concavo-convex bell 84 (Fig. 7) which is secured by a bracket 86 to the standard 14. That is, one end 88 of the bracket 86 is secured to the standard, the intermediate portion 90 extends beyond the standard and has a terminal portion 92 located in the recess of the bell and fastened thereto as at 94. The bell is thus in spaced parallelism with respect to the standard. A flexible spring finger 96 is anchored at its lower end 98 on the standard parallel to the standard and extends upwardly into the space between the standard and bell where it is provided with a bell striker 100. The actuator for the finger and striker comprises a substantially L-shaped member having a vertical limb 102 fixed to and depending from the pivoted central portion of the first arm 30 as shown in Fig. 4. The laterally directed short arm 104 is slightly arcuate and provided on its lower or bottom edge with longitudinally spaced teeth 106 which rake across the tip 108 of the finger to cause the striker to function in an obvious manner. If desired a sheath 110 may be suitably fixed on the upper end of the standard and this constitutes a receiver and stop for the long arm 102 which is sandwiched between the standard and the sheath in the manner shown in Fig. 5. This embraces and effectuates positive operation of the stated actuator particularly the long arm 102. It also provides a satisfactory and stable mount for the pivot means 32 as also seen in Fig. 5. A portion of the wall of the sheath is slotted at the rear side of the standard as at 112 (see Fig. 4). Thus the up and down swinging motions of the arm 30 are guided and stabilized.

In some tip-ups signalling flags are employed for visual signalling means at the outer end of the lever or arm means but here the flag can be dispensed with inasmuch as the signalling member 68 constitutes a satisfactory substitute for a flag and also provides the aforementioned play of the line to assist in trapping the fish. Not only this, this signal 68 tends to swing up and down on its pivot 74 and may be said to simulate the action and function of a bobber indicating that a strike has been made.

By employing a bell and the novel actuating means the overall utility of the tip-up is enhanced since the fisherman may have any number of tip-ups set for use and when the bell rings his attention is attracted to the particular tip-up which has been sprung and has come into play.

The cocked or set position of the tip-up is shown in Fig. 1 and here it will be evident that the latch or keeper roller 54 is releasably engaged in the keeper notch 34. Both arms are thus poised and ready to make the catch. When the baited hook is taken and a pull is exerted on the line 80 the L-shaped signal member 68 is operated first and allows limited paying out of the line. A further pull on the line exerts stress on the second arm 46 pulling it down and causing it to pivot on its hinge or pivot means 48. This functions to raise the extension 50 and to release the latch or keeper from the keeper notch. This results in the spring 40 coming into play and jerking the first arm 30 downwardly from its original position in Fig. 1 to the position seen in Fig. 3. The adjustable spring 40 and the adjustable spring means 64 makes it possible for the user to properly coordinate these devices to render the tip-up satisfactorily operable.

Not only does the functioning of the signal means 68 attract attention of the fisherman, the audible bell also continues to function. That is to say, the two arms 30 and 46 rock up and down on the pivot 32 and standard allowing the arm 104 (Fig. 4) to reciprocate and to rake back and forth over the tip of the finger 108.

The aforementioned finger piece 56 assists one in re-setting the tip-up once it has been caused to operate.

With reference to Fig. 2 the headed pins 114 and 116 on one side of the arm 46 are there to permit the line 80 to be wound thereon when the device is not in use.

Referring now to Fig. 10, it is repeated that this will serve to reveal that the invention contemplates a stand having the tripodal base 10 of Fig. 1 and also the optional base seen in Fig. 10. This has a socket member 113 for the standard 14A and embodies a suitable clamp 115 for use on a wharf, gunwale of a boat and so on.

It will be evident that the tip-up is shown cocked and in readiness for use in Fig. 1 where, obviously, the latch roller means 54 is engaged in the keeper notch and is held in a so-called set position until the baited line is taken. Assuming then that a strike has been made the downward pull on the line 80 causes the member 68 to operate in the manner already described. Further exertion on the arm 46 causes it to swing on the pivot 48 to lift the latch roller out of the keeper notch, whereupon the arm 30 is immediately jerked forcibly down by the tension spring 40. The fact that the collar 58 serves as a sort of a shackle or connection between the two arms causes both arms to swing up to the tripped position in Fig. 3.

Reverting to Fig. 11, it will be observed that the end portion of arm 72 of the visual signal 68 has a screw-threaded hole 71 to accommodate the screw-threaded shank 73 of a weight 75. This weight can be screwed into threaded hole 71 if necessary to counteract the difference in weight of different sinkers or baits that might be used on line 80. This can be made in different weight sizes and used, as desired, to maintain proper balance of the visual signal 68.

What is claimed as new is as follows:

1. An unattended pull actuated fishing tip-up comprising a vertical standard, base means carried by the lower end of said standard whereby it may be located and anchored to fix the standard at the desired spot from which the fishing is to be done, a first rigid arm pivotally connected intermediate its ends atop said standard, a coil spring situated rearwardly of said standard and attached at its upper end to the rearward end of said arm and at its lower end to an intermediate portion of said standard, said first arm being vertically swingable in an arcuate path relative to said standard, a second rigid arm having a portion in general alignment with said first arm and having a rearward end portion pivoted to the forward end of said first arm, the upper end of said standard having a keeper notch therein, the rearward end portion of said second arm being contiguous to and having keeper means seated removably in said keeper notch, spring biased means cooperable with both of said arms and serving to bias and yieldingly but releasably seat said keeper in said keeper notch, and means on the forward end of said second arm for the attachment of a baited fishing line to said forward end.

2. The structure defined in claim 1 and a bell fixed on said standard below the pivotal connection of said first arm and standard, a striker also mounted on said standard and cooperable with said bell, and means fixed on said first arm and depending therefrom and operatively cooperable with said striker in a manner to ring the bell.

3. The structure defined in claim 1 and in combination, a bell bracket on said standard and spaced in parallelism from the standard, a spring finger having its lower end also fixed on said standard and its upper end freely actuatable in the space between the standard and open concave side of the bell and provided with a striker normally out of contact with the bell rim but capable of being struck against said bell to provide an audible signal, and actuating means for the finger and striker fixed on and depending from said first arm and operatively engageable with the extreme upper end of said finger.

4. The structure defined in claim 3 and wherein said actuating means comprises a substantially L-shaped member embodying a vertical depending leg fixed at its upper end to said first arm and swingable in a vertical plane toward and from said standard and bell, and a substantially horizontal leg operable in the space between the bell and standard, said horizontal leg having depending longitudinally spaced teeth positioned and adapted to successively rake across the tip of the upper end of said finger to, in this manner, vibrate and operate said finger and striker and to thus ring said bell.

5. An unattended pull actuated fishing tip-up comprising a vertical standard, base means carried by the lower end of said standard whereby it may be located and anchored to fix the standard at the desired spot from which the fishing is to be done, a rigid arm pivotally connected intermediate its ends atop said standard, a coil spring situated rearwardly of said standard and attached at its upper end to the rearward end of said arm and at its lower end to said standard, pull released means cooperable with said standard and arm and functioning to retain said arm in a predetermined set position and simultaneously tensioning and cocking said spring, said arm being vertically swingable in an arcuate path relative to said standard when it is released and said spring, which is cocked and is normally under tension is released, comes into play, a bell bracketed on said standard and spaced in parallelism from the standard, a spring finger having its lower end also fixed on said standard and its upper end freely actuatable in the space between the standard and open concave side of the bell and provided with a striker normally out of contact with the bell rim but capable of being struck against said bell to provide an audible signal, and actuating means for the finger and striker fixed on and depending from said first arm and operatively engageable with the extreme upper end of said finger, said actuating means comprising a substantially L-shaped member embodying a vertical depending leg fixed at its upper end to said first arm and swingable in a vertical plane toward and from said standard and bell, and a substantially horizontal leg operable in the space between the bell and standard, said horizontal leg having depending longitudinally spaced teeth positioned and adapted to successively rake across the tip of the upper end of said finger to, in this manner, vibrate and operate said finger and striker and to thus ring said bell.

6. An automatic fish hooking tip-up comprising a standard, base means carried by said standard, a first rigid arm pivotally connected intermediate its ends atop said standard, a coil spring situated rearwardly of said standard and attached at its upper end to the rearward end of said arm and at its lower end to a portion of said standard, said first arm being vertically swingable in an arcuate path relative to said standard when said spring comes into play, a second rigid arm having a portion in general alignment with said first arm and having a rearward end portion pivoted to the forward end of said first arm, the upper end of said standard having a keeper notch therein, the rearward end portion of said second arm being contiguous to and having keeper means seated removably in said keeper notch, spring biased means cooperable with both of said arms and serving to bias and yieldingly but releasably seat said keeper in said keeper notch, an L-shaped trip member embodying a long limb superimposed against and pivoted between its ends to one side of the free forward end of said second arm, the short arm being spaced outwardly from said free forward end and being adapted to permit the adjacent end of a fishing line to be connected thereto, a fixed stop on said forward end portion rearwardly of the pivot point of said long arm, said long arm being engageable with said fixed stop in a manner to limit the swinging movement of the cooperating portion of the long arm downwardly and also serving to hold and keep the long arm in its initially set ready-to-use position until a strike is had, an abutment fixed on said long arm forwardly of said pivot point, and an adjustable stop-screw carried by said first arm forwardly of said fixed stop, said abutment being engageable with said stop-screw in a manner to check the downward swing of the cooperating portion of said long arm.

7. An unattended pull actuated fishing tip-up comprising a vertical standard, base means carried by the lower end of said standard whereby it may be located and anchored to fix the standard at the desired spot from which the fishing is to be done, a first rigid arm pivotally connected intermediate its ends atop said standard, a coil spring situated rearwardly of said standard and attached at its upper end to the rearward end of said arm and at its lower end to an intermediate portion of said standard, said first arm being vertically swingable in an arcuate path relative to said standard when said spring is cocked and is normally under tension and comes into play, a second rigid arm having a portion in general alignment with said first arm and having a rearward end portion overlapping and hingedly connected with the forward end of said first arm, the upper end of said standard having an upwardly opening keeper notch therein, said rearward end portion being offset upwardly and reaching over and rearwardly beyond the notched upper end of said standard, a freely rotatable keeper roller suspended from said upward offset rearward end and releasably engageable in said keeper notch, a rigid loop-like collar encircling said arms forwardly of said keeper roller and standard and saddled over and fixed at its upper portion to and movable with said rearward end portion and having its lower end portion normally spaced below and detached from the lower edge of said first arm, and manually regulable spring check means cooperable with said lower end of said collar and cooperable encircled portions of said arms in a manner to allow said second arm, when it is tripped, to swing slightly down relative to said first arm, whereby to release the keeper roller from said notch and to permit said coil spring and first arm to function.

References Cited in the file of this patent

UNITED STATES PATENTS

| | | |
|---|---|---|
| 693,071 | Ruud | Feb. 11, 1902 |
| 2,564,840 | Glenn | Apr. 21, 1951 |
| 2,744,351 | Smith | May 8, 1956 |